United States Patent
Embid Droz et al.

(10) Patent No.: US 9,458,713 B2
(45) Date of Patent: Oct. 4, 2016

(54) GENERATING HYDROCARBON RESERVOIR SCENARIOS FROM LIMITED TARGET HYDROCARBON RESERVOIR INFORMATION

(71) Applicants: Repsol, S.A., Madrid (ES); International Business Machines Corporation, Armonk, NY (US)

(72) Inventors: Sonia Mariette Embid Droz, Madrid (ES); Ruben Rodriguez Torrado, Madrid (ES); Giorgio De Paola, Madrid (ES); Mohamed Ahmed Hegazy, Heliopolis Cairo (EG); Bruno Da Costa Flach, Copacabana (BR); Ulisses T. Mello, Blauvelt, NY (US)

(73) Assignees: REPSOL, S. A., Madrid (ES); International Business Machines Corporation, Armonk, NY (US)

( * ) Notice: Subject to any disclaimer, the term of this patent is extended or adjusted under 35 U.S.C. 154(b) by 272 days.

(21) Appl. No.: 14/220,397

(22) Filed: Mar. 20, 2014

(65) Prior Publication Data

US 2014/0207383 A1     Jul. 24, 2014

Related U.S. Application Data

(63) Continuation-in-part of application No. 13/963,818, filed on Aug. 9, 2013, now Pat. No. 9,262,721, and a continuation-in-part of application No. 13/677,289, filed on Nov. 14, 2012, now Pat. No. 9,159,022.

(30) Foreign Application Priority Data

Jun. 28, 2013   (EP) .................................... 13382254

(51) Int. Cl.
   *E21B 49/00* (2006.01)
   *G01V 11/00* (2006.01)
   (Continued)

(52) U.S. Cl.
   CPC ............. *E21B 49/00* (2013.01); *G01V 11/002* (2013.01); *G06N 7/005* (2013.01); *G06Q 10/04* (2013.01)

(58) Field of Classification Search
   None
   See application file for complete search history.

(56) References Cited

U.S. PATENT DOCUMENTS

| 7,363,163 B2 | 4/2008 | Le Ra Valec-Dupin et al. |
| 2008/0234988 A1 | 9/2008 | Chen et al. |

(Continued)

FOREIGN PATENT DOCUMENTS

WO   WO2009/145960   12/2009

OTHER PUBLICATIONS

Hashemi, "Logical considerations in applying pattern recognition techniques on seismic data: Precise ruling, realistic solutions," CSEG Recorder, Apr. 2010, pp. 47-49.

(Continued)

*Primary Examiner* — Stanley K Hill
*Assistant Examiner* — Mikayla Chubb
(74) *Attorney, Agent, or Firm* — Law Office of Charles W. Peterson, Jr.; Louis J. Percello, Esq.

(57) ABSTRACT

A system, method and computer program product for generating scenarios of hydrocarbon reservoirs based on limited amount of information on a target hydrocarbon reservoir, and more particularly to automatically supplying missing parameters and uncertainty associated with each supplied parameter allowing to valuating the target hydrocarbon reservoir.

7 Claims, 3 Drawing Sheets

(51) Int. Cl.
*G06Q 10/04* (2012.01)
*G06N 7/00* (2006.01)
*G06F 17/00* (2006.01)

(56) References Cited

U.S. PATENT DOCUMENTS

| | | |
|---|---|---|
| 2011/0118983 A1 | 5/2011 | Rowan |
| 2011/0246161 A1 | 10/2011 | Morton et al. |
| 2012/0232865 A1 | 9/2012 | Maucec et al. |
| 2014/0345862 A1* | 11/2014 | Jerauld .................. C09K 8/588 166/275 |
| 2015/0153476 A1* | 6/2015 | Prange .................... E21B 43/00 703/2 |

OTHER PUBLICATIONS

ISR mailed Mar. 10, 2014 for the grandparent to this application, U.S. Appl. No. 13/677,289—PCT/US2013/068986.
Wang "Reservoir Characterization and Horizontal Well Placement Guidance Acquisition by Using GIS and Data Mining Methods", Thesis for University of Calgary, Jun. 2012, http://www.ucalgary.ca/engo_webdocs/XW/12.20355_Baijie%20Wang.pdf.
Holdaway Let Oil and Gas Talk to You: Predicting Production Performance, Apr. 2012. 5 http://support.sas.com 25 A Iresources/papers!proceedings121342-2012.pdf.
Jef Caers et al., "Multiple-point geostatistics: a quantitative vehicle for integrating geologic analogs into multiple reservoir models." Jan. 2, 2002.
European Search Report, EP13382254, Oct. 30, 2013.

* cited by examiner

FIG. 4

GENERATING HYDROCARBON RESERVOIR SCENARIOS FROM LIMITED TARGET HYDROCARBON RESERVOIR INFORMATION

CROSS REFERENCE TO RELATED APPLICATION

The present application is a continuation in part of U.S. patent application Ser. No. 13/963,818, "AUTOMATICALLY SELECTING ANALOGOUS MEMBERS FOR NEW POPULATION MEMBERS BASED ON INCOMPLETE DESCRIPTIONS, INCLUDING AN UNCERTAINTY CHARACTERIZING SELECTION" to Hegazy et al. filed Aug. 9, 2013, and a continuation in part of U.S. patent application Ser. No. 13/677,289, "SYSTEM, METHOD AND PROGRAM PRODUCT FOR AUTOMATICALLY SUPPLYING MISSING PARAMETERS FOR MATCHING NEW MEMBERS OF A POPULATION WITH ANALOGOUS MEMBERS" to Mohamed Ahmed Hegazy et al., filed Nov. 14, 2012; and further claims priority under 35 USC §119 to European Patent Application No. EP13382254, "METHOD TO GENERATE SCENARIOS OF HYDROCARBON RESERVOIRS BASED ON LIMITED AMOUNT OF INFORMATION ON A TARGET HYDROCARBON RESERVOIR" to Embid Droz et al.; filed Jun. 28, 2013 with the Spanish Patent Office, assigned to the assignees of the present invention and incorporated herein by reference.

BACKGROUND OF THE INVENTION

1. Field of the Invention

The present invention is related to generating scenarios of hydrocarbon reservoirs based on limited amount of information on a target hydrocarbon reservoir, and more particularly to automatically supplying missing parameters and an uncertainty associated with each supplied parameter allowing to valuating the target hydrocarbon reservoir.

2. Background Description

Determining whether investing in a new hydrocarbon reservoir candidate is a good business decision depends on the inherent value of the reservoir. Factors determining the inherent value of the reservoir include, for example, the total amount of material that is ultimately recoverable from each new hydrocarbon reservoir (production potential), market prices (oil and/or natural gas prices) and the cost of recovering that material, or capture difficulty. Until the material is actually recovered, however, that inherent value can be estimated from different, primarily known, reservoir properties.

However, investment opportunities frequently include a number of candidate reservoirs with spotty available information on each. Even with a dearth of available information, however, it is imperative to assess the value of each candidate accurately. This assessment may be even more complex when types of available information vary from candidate to candidate. Arriving at an optimal project portfolio value requires a uniform assessment that consistently evaluates all alternatives uniformly.

Some investment candidate estimates have been based on identifying existing reservoirs with properties that match or closely match (i.e., are similar to) the new, candidate reservoir. The closest existing reservoirs are known as "analogous reservoirs."

Typically, one or more experts (e.g., geologists and reservoir engineers) identified and selected analogous reservoirs, based solely on experience and known or available investment candidate properties. Relevant information of such analogous reservoirs are stored in data bases having records with information on volumetric, facies and properties distribution, wherein all records not necessarily have all properties.

The specialized literature shows continuously increased interest in analogues and its predictions. Sophisticated data mining and machine learning algorithms allow estimation of properties and such estimations also define the degree of uncertainty which can be reliably used within geostatistical workflows. Example can be found on the usage of reservoir analogous in the context of reservoir drive mechanism, recovery factor or reserve estimation and classification.

Insufficient information, however, can make selecting analogous reservoirs guesswork at best, and make estimating the value error prone and uncertain. A mis-valuation could lead to wasted resources, e.g., from passing on an undervalued reservoir to exploit an overvalued reservoir. Missing parameters increase uncertainty and the likelihood of a mis-valuation.

Thus, there is a need for generating scenarios compatible with the limited amount of information available on a target hydrocarbon reservoir, while including an associated uncertainty for the assessment; and more particularly, for estimating geological and petrophysical properties.

SUMMARY OF THE INVENTION

The present invention is related to generating scenarios of hydrocarbon reservoirs when only limited amount of information on a target is available. Ranking reservoirs with different level of associated uncertainty within the same framework becomes key to make robust and unbiased decisions. The present invention allows assessing not only the geological parameters not known a priory with their associated uncertainty but also the geological and structural uncertainty of the reservoir with an accurate propagation of the inherent uncertainty.

Normally, geological information comes from well logs, cores analysis, seismic data, etc. and production data can also be used to mitigate the uncertainty however in absence of these the geological scenario becomes hard to predict.

In most of cases, geological information includes scalar values lacking of spatial distributions as a three-dimensional structure. The preferred method generates scenarios of hydrocarbon reservoirs having a three-dimensional structure even if departing from scalar values.

According to a first aspect, generating scenarios of hydrocarbon reservoirs compiles information on the target hydrocarbon reservoir. Such information provides a concept model for the whole domain of the scenario. This information includes scalar properties and may also provide uncertainty data such as minimum and maximum values of some scalar data.

An integer number n of facies are proposed. For each facies, the partial rate $f_i$, a normal distribution of the porosity having a mean value $\bar{\phi}_i$ and the cutoff values $\phi_i^{min}$ and $\phi_i^{max}$ are automatically provided for a predetermined threshold such that the area of the tail of the normal distribution is deemed to be neglectible beyond such threshold. Such variables are provided by solving an optimization problem that distributes the normal distribution of each facies in such a way the concept model is reproduced. The concept model is characterized by the number of facies and $\phi_{ref}^{min}$, $\phi_{ref}^{max}$, and the $\bar{\phi}_{ref}$ values of porosity of the target hydrocarbon reservoir.

A computed partial rate $f_i$ populates a plurality of three-dimensional scenarios having a three-dimensional domain and the shape of the n facies using a multipoint statistical method, preferably and not limited to a Sequential Indicator Simulation.

Once the plurality of three-dimensional scenarios with the n facies are generated, each facies with its partial rate $f_i$ and the normal distribution of the porosity is defined by the mean value $\bar{\phi}_i$ and the cutoff values $\phi_i^{min}$ and $\phi_i^{max}$, and further the spatial distribution of the permeability, the saturation and the net-to-gross variables may be populated.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
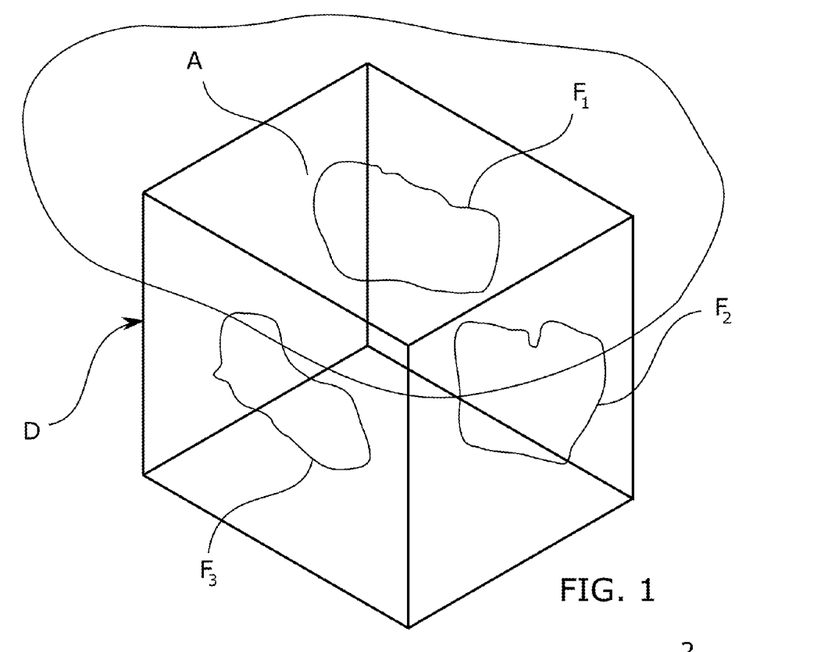
FIG. 1 shows an example of a domain having three facies located within the domain.

Turning now to the drawings and more particularly, FIG. 1 shows an example of an a prospective field for evaluation according to a preferred embodiment of the present invention, which begins by compiling information on the target hydrocarbon. This information may be interpreted by a skilled person who may provide the number n of facies from this collected information. The number of facies is preferably between 1 and 8. The field shown in FIG. 1 has a domain (D) under certain portion of its surface, the area identified with letter A. This figure shows a domain (D) having three facies $F_1$, $F_2$ and $F_3$ distributed within the domain.

In absence of any information from seismic or maps the reservoir domain (D) is considered as a hexahedral shape. Structural uncertainty is considered on both shape and volume. In the present case since the conceptual model is a regular shape the uncertainty is represented by the reservoir area and thickness and the width-over-length ratio.

An interpolative function has been developed to estimate the joint distribution of reservoir area and thickness from the analogues data base whereas the width-over-length ratio parameter is assumed to be uniformly varying between its boundaries. Numerical analysis has shown that the reservoir area and thickness could be approximated with a lognormal bivariate distribution with a high confidence interval.

The joint probability of area and thickness may be key to preserving the interval of confidence given from the analogues in terms of volumetric and reserves. If there is information about the total amount of the oil of the reservoir or such amount may be estimated then the domain must be chosen big enough to contain that amount of oil.

According to a preferred embodiment of the present invention the number of facies and other properties may be obtained comparing the target information with the analog data base.

Each facies $F_i$, $i=1\ldots n$, is modeled by its partial rate $f_i$, and a normal distribution of the porosity having a mean value $\bar{\phi}_i$ and the cutoff values $\phi_i^{min}$ and $\phi_i^{max}$ for a predetermined threshold such that the area of the tail of the normal distribution is deemed to be neglectible beyond such threshold. Once the threshold is predetermined, the normal distribution is taken to be limited between $\phi_i^{min}$ and $\phi_i^{max}$ and the mean value satisfies $\bar{\phi}_i=(\phi_i^{max}+\phi_i^{min})/2$. The partial rate $f_i$ satisfies that $\Sigma_{i=1}^{n} f_i=1$ being n the number of facies already fixed.

Figure 3:
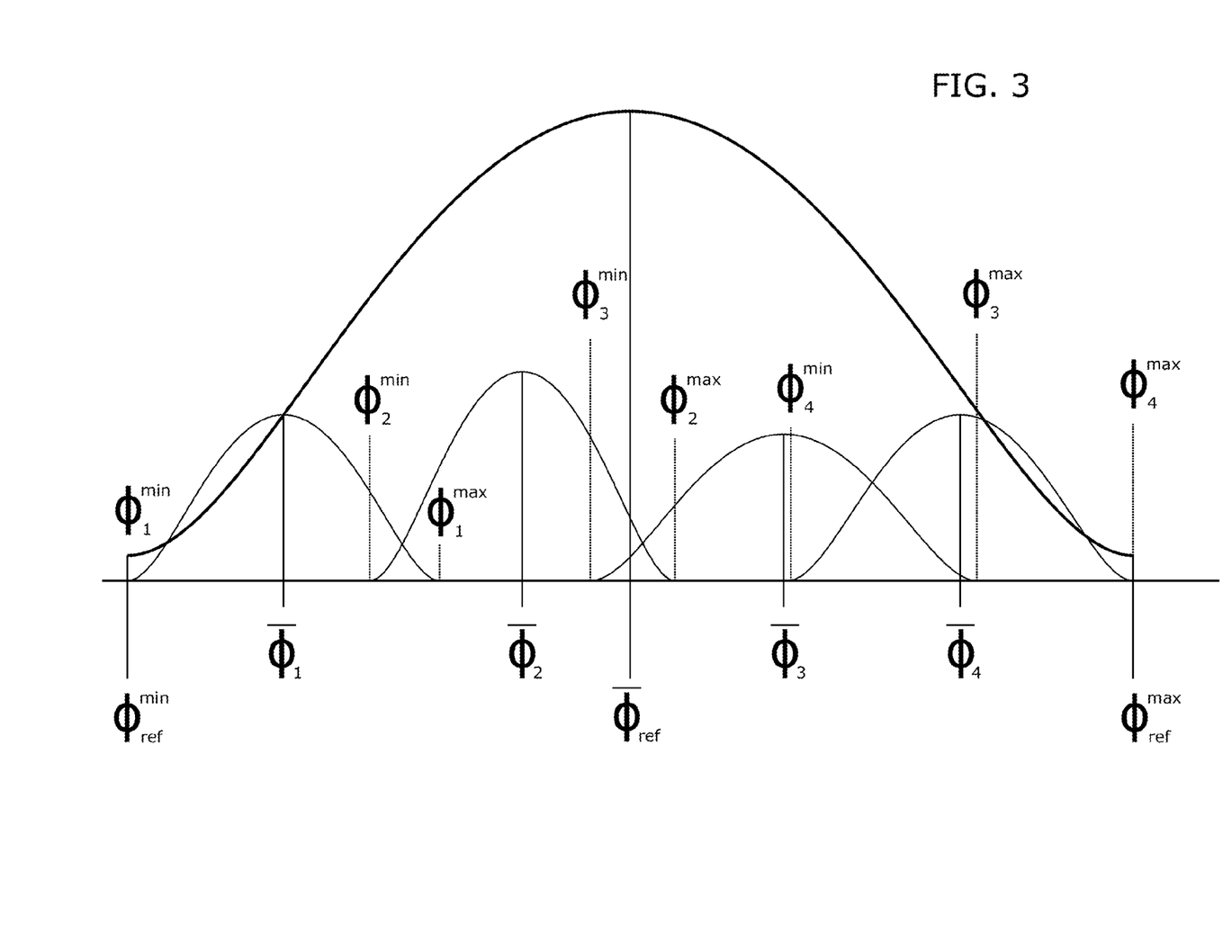
FIG. 3 shows an example of the distribution of the porosity for the concept model and how the normal distribution for each facies is distributed reproducing the concept model by solving an optimization problem.

As is shown in FIG. 3, the whole domain is modeled $\phi_{ref}^{min}$, $\phi_{ref}^{max}$, and $\bar{\phi}_{ref}$ values which may be provided by a skilled person or the estimation may be obtained from the analogues data base, or more briefly "the analogues."

Next step calculates $f_i$, $\bar{\phi}_i$, $\phi_i^{max}$, $\phi_i^{min}$, $i=1\ldots n$ as the solution of a minimization problem wherein the cost function is defined by the expression $$\text{Min}(\|\phi_{left}^{min}-\phi_{ref}^{min}\|+\|\bar{\phi}_{ref}-\Sigma_{i=1}^{n}f_i\bar{\phi}_i\|+\|\phi_{right}^{max}-\phi_{ref}^{max}\|)$$

wherein $\phi_{left}^{min}$ and $\phi_{right}^{max}$ are defined by the condition $$\phi_{left}^{min}=\text{Min}(\phi_i^{min}); i=1,\ldots,n$$

$$\phi_{right}^{max}=\text{Max}(\phi_i^{max}); i=1,\ldots,n$$

and $\bar{\phi}_i$ are taken such that $\bar{\phi}_i<\bar{\phi}_{i+1}$ $i=1\ldots n-1$.

In an embodiment, the norm $\|\cdot\|$ has been implemented as the Euclidean norm. The objective function to be minimized represents the error between the estimated property as a function of facies type and the value provided for instance by the analogues.

FIG. 3 shows a four facies case (n=4) wherein the four normal distributions of porosity are distributed according to the minimum of the cost function; and, the partial rate $f_i$, $i=1,\ldots,4$ is simultaneously determined.

This minimization problem may be solved using Mixed Integer Linear Programming (MILP). The solution jointly computes the relative proportion of each facies and the conditional distribution of the properties per facies. This estimates will be consistent with the value of min, max and average used as the reference: $\phi_{ref}^{min}$, $\phi_{ref}^{max}$, and $\bar{\phi}_{ref}$.

Figure 2:
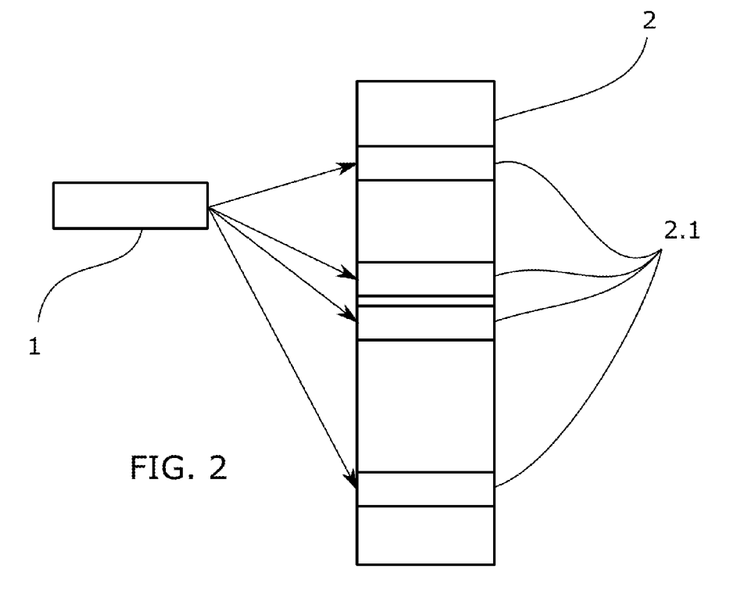
FIG. 2 shows an example of a schematic representation of an analogous data base wherein selected records have been selected when comparing the information of the target according to a predefined criterion.

In one embodiment the reference values $\phi_{ref}^{min}$, $\phi_{ref}^{max}$, and $\bar{\phi}_{ref}$ are obtained from the analogues data base (2). When compiling information on the target (1) hydrocarbon reservoir, said information at least has a material property among the material properties in the records of the analog data base. The reference values are determined as follows:

When providing an analogues data base (2) of known reservoir records, at least one record further includes the porosity of the material, that is, the minimum value $\phi_{an}^{min}$ of the porosity, the mean value $\bar{\phi}_{an}$ of the porosity, and the maximum value $\phi_{an}^{max}$ of the porosity. These three values allow assuming a property distribution shape such as a normal distribution. The porosity will be used to compute the reference value as the mean value of a subset of records of the analogs data having such property.

When compiling information on the target hydrocarbon, such information has at least a material property among the material properties in the records of the analog data base. Common properties in the target hydrocarbon reservoir and in the analogs data base allows comparing the target (1) information and closely related analogues records (2.1). Common properties may be different to the porosity.

Provide a similarity criterion for the comparison of reservoirs sharing at least a common material property. The similarity criterion is the criteria to define which records of the analogues data base are close to the target (1). This criterion may even combine properties or correlation between two or more properties.

Select the set of m records (2.1) in the analogues data base (2) meeting the similarity criterion with the target reservoir, wherein at least one record of the selected records includes the porosity of the material. Determining $\phi_{ref}^{min}$, $\phi_{ref}^{max}$, and the $\bar{\phi}_{ref}$ values wherein said values are obtained for the set of records of the analog data base selected as:

$$\phi_{ref}^{min}=\text{Mean}(\phi_{an,j}^{min}) \, j=1\ldots m;$$

$$\bar{\phi}_{ref}=\text{Mean}(\bar{\phi}_{an,j}) \, j=1\ldots m; \text{ and,}$$

$$\phi_{ref}^{max}=\text{Mean}(\phi_{an,j}^{max}) \, j=1\ldots m,$$

for all records having the porosity information.

Preferably, the plurality of three-dimensional scenarios having a three-dimensional domain is obtained generating the dimensions of said domain randomly. If the analogues include volumetric data such as the reservoir area and thickness, NTG (net-to-gross) and saturation information, then the maximum capacity to store oil within the domain is calculated. If the randomly generated domain (D) is not big enough to store the calculated volume of oil then said domain (D) is discarded.

For example, the OOIP (original oil in place) may be estimated as:

$$\frac{V\phi NTGS}{B}$$

wherein V is the volume of the domain, $\phi$ is the mean value of the porosity, NTG is the mean value of the net-to-gross value, S is the saturation and, B is the expansion factor of the oil when it is extracted from the reservoir and stored at ambient pressure.

Once each facies has been generated and $f_i$, $\overline{\phi}_i$, $\phi_i^{max}$, $\phi_i^{min}$, i=1 . . . n variables are determined, the porosity is spatially distributed based on its statistical distribution $\overline{\phi}_i$, $\phi_i^{min}$, $\phi_i^{max}$ using a geo-statistical algorithm providing a predetermined longitudinal correlation equation and a predetermined orientation. In this case, the spatial distribution of the porosity is defined in each scenario of the plurality of scenarios.

After populating the porosity according to its statistical distribution, the longitudinal correlation equation and the orientation, the permeability property (K) is determined for each scenario.

To carry out this further step, the records of the analogues data base (2) have to include the permeability property of the materials and the porosity. From the selected records the correlation between the permeability versus the porosity is calculated wherein most of the cases the law between both variables is expressed as the logarithmic value of the permeability versus the porosity according to the Carman-Kozeny law. The selected records are those for which the reference values $\phi_{ref}^{min}$, $\phi_{ref}^{max}$, and $\overline{\phi}_{ref}$ are obtained from the analogues data base (2).

According to the Carman-Kozeny law the equation $$K = C \frac{\phi^3}{(1-\phi)^2}$$

is used to fit the scatter plot obtained from the relation between permeability (K) and porosity ($\phi$). The coefficient C can be estimated using a least squares regression. To allow low scatter in the distribution further filters on the analogues results can be applied that exploit possible correlation with additional variables as could be depth. The permeability variance has also been parametrized using a linear regression model as a function of porosity in order to correctly propagate the uncertainty in the three/dimensional realizations. To have a reliable simulation it may be important to separate the effects of the mean (the trend) which is deterministic and the variance which is simulated by geo-statistical techniques.

Figure 4:
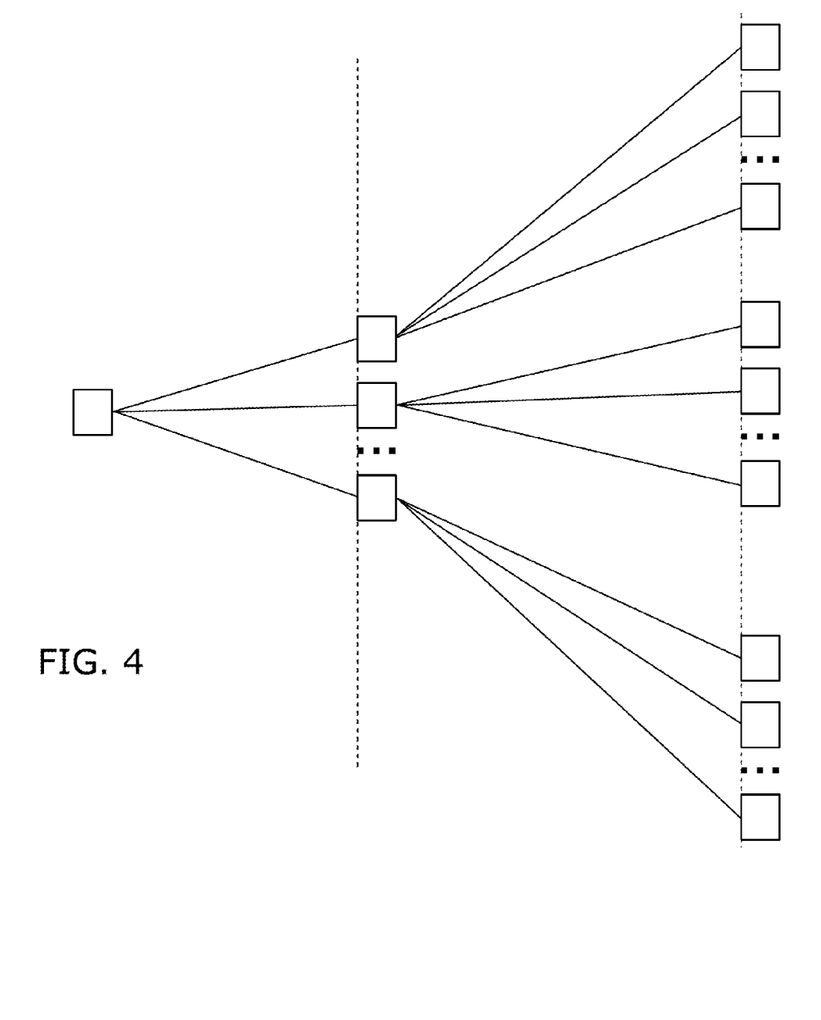
FIG. 4 shows an example of the set of scenarios generated in each property calculation providing a first generation and a second generation of scenarios.

The correlation law provides the scalar distribution of the permeability as a function of the porosity. Using a geo statistical algorithm, for each domain of the generated scenarios the permeability as a scalar field is defined over said three-dimensional domain. For each scenario generated when the porosity has been populated, the geo-statistical algorithm generates a plurality of scenarios taking into account the variability of the permeability property. FIG. 4 shows the initial scalar data, the first group of scenarios generated when populating the porosity property taking into account uncertainty; and, according to the last step, the plurality of scenarios departing from each former scenario wherein this second generation of scenarios provides the variability of the permeability taking into account how the uncertainty for said permeability property is propagated.

Further, once the porosity and the permeability have been distributed in the second generation of scenarios, water saturation may be calculated. To compute initial water saturation and later the net-to-gross ratio, the analogous results have been further exploited.

In this case, the selected records, those selected when the reference values $\phi_{ref}^{min}$, $\phi_{ref}^{max}$, and $\overline{\phi}_{ref}$ are obtained from the analogues data base (2), also include the water saturation, or data on water saturation allowing to calculate the $\overline{S}$ for instance using a correlations taking into account several properties different from the water saturation.

For the m selected records, being m>n, using the mean porosity conditioned on facies computed in the optimization algorithm together with the mean per each analogues j we can express the following overestimated system of m equations:

$$\Sigma_{i=1}^{n} \tilde{f}_i \overline{\phi}_i = \overline{\phi}_{an,j}$$

solved preferably by the least squares method. The equation $\Sigma_{i=1}^{n} \tilde{f}_i \overline{\phi}_i = \overline{\phi}_{an,j}$ is defined for all j=1, . . . , m selected records of the analogues data base (2) and the n unknowns, the facies proportion per analogue, $\tilde{f}_i$ i=1, . . . , n.

Analogously the system of equations $$\overline{S}_{an,j} = \Sigma_{i=1}^{n} \tilde{f}_i \overline{S}_i$$

and $$\overline{NTG}_{an,j} = \Sigma_{i=1}^{n} \tilde{f}_i \overline{NTG}_i$$

are specified for water saturation and net-to-gross calculation. In this case, the facies proportion per analogue, $\tilde{f}_i$ i=1, . . . , n is known from the former system and the mean of the water saturation for each facies and the mean of the net-to-gross also for each facies is obtained by solving the overestimated system, for instance, by least square method.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A data processing system for generating scenarios of hydrocarbon reservoirs based on limited amount of information on a target hydrocarbon reservoir, said data processing system comprising:
   means for compiling information on the target hydrocarbon reservoir,
   means for providing a number n of facies comprising an integer between 1 and 8, in the domain of the scenario modeling the target hydrocarbon reservoir, wherein each facies $F_i$, i=1 . . . n, is modeled by its partial rate $f_i$, and a normal distribution of the porosity having a mean value $\overline{\phi}_i$ and the cutoff values $\phi_i^{min}$ and $\phi_i^{max}$ for a predetermined threshold such that the area of the tail of the normal distribution is deemed to be neglectible beyond such threshold, subject to the following restrictions:

$$\overline{\phi}_i < \overline{\phi}_{i+1} \; i = 1 \ldots n-1$$

$$\overline{\phi}_i = (\phi_i^{max} + \phi_i^{min})/2$$

$$\sum_{i=1}^{n} f_i = 1$$

means for determining $\phi_{ref}^{min}$, $\phi_{ref}^{max}$, and the $\overline{\phi}_{ref}$ values,
   means for determining $f_i$, $\overline{\phi}_i$, $\phi_i^{max}$, $\phi_i^{min}$, i=1 . . . n as the solution of a minimization problem wherein the cost function is defined by the expression $$\text{Min}\left(\|\phi_{left}^{min} - \phi_{ref}^{min}\| + \left\|\overline{\phi}_{ref} - \sum_{i=1}^{n} f_i \overline{\phi}_i\right\| + \|\phi_{right}^{max} - \phi_{ref}^{max}\|\right)$$

wherein $\phi_{left}^{min}$ and $\phi_{right}^{max}$ are defined by the condition $\phi_{left}^{min} = \text{Min}(\phi_i^{min}); i=1, \ldots, n$ $\phi_{right}^{max} = \text{Max}(\phi_i^{max}); i=1, \ldots, n;$ means for multipoint statistical analysis for generating a plurality of three-dimensional scenarios having a three-dimensional domain and the shape of the n facies, said means for multipoint statistical analysis being restricted to the number of facies n, and the partial rates of facies $f_i$, i=1 . . . n.

2. A data processing system according to claim 1 wherein the means for determining $\phi_{ref}^{min}$, $\phi_{ref}^{max}$, and $\overline{\phi}_{ref}$ comprises:
means for providing an analog data base of known reservoir records, at least one record further comprises the porosity of the material, that is, the minimum value $\phi_{an}^{min}$ of the porosity, the mean value $\overline{\phi}_{an}$ of the porosity, and the maximum value $\phi_{an}^{max}$ of the porosity,
means for compiling target hydrocarbon reservoir information having at least a material property among the material properties comprised in the records of the analog data base,
means for providing a similarity criterion for the comparison of reservoirs sharing at least a common material property,
means for selecting the set of m records in the analog data base meeting the similarity criterion with the target reservoir, wherein at least one record of the selected record comprises the porosity of the material,
means for obtaining the set of records of the analog data base when determining $\phi_{ref}^{min}$, $\phi_{ref}^{max}$, and the $\overline{\phi}_{ref}$ values as:

$\phi_{ref}^{min} = \text{Mean}(\phi_{an,j}^{min}) j=1 \ldots m$ $\overline{\phi}_{ref} = \text{Mean}(\overline{\phi}_{an,j}) j=1 \ldots m;$ and, $\phi_{ref}^{max} = \text{Mean}(\phi_{an,j}^{max}) j=1 \ldots m$ for all records having the porosity information.

3. A data processing system according to claim 2, wherein a plurality of records of the analog data base further include the permeability (K) property of the materials and the porosity, and the data processing system further comprises:
means for determining a correlation between the permeability versus the porosity with the Carman-Kozeny law expressed as the logarithmic value of the permeability versus the porosity, obtained from the selected set of analog data base records,
means for obtaining the dispersion of the Carman-Kozeny law from the same selected set of analog data base records,
means for defining permeability as a scalar field over the three-dimensional domain for each three-dimensional scenario generated based on the correlation between permeability and porosity and its variability by means of geo-statistical algorithm.

4. A data processing system according claim 2, wherein the means for selecting the set of m records of the analog data base further comprises:
means for selecting the water saturation values of the materials $\overline{S}$, or, data on water saturation allowing to calculate the $\overline{S}$,
means for postprocessing such data and averaging water saturation for each facies comprising:
means for solving the over determined system of m equations for the m selected records, being m>n, by mean square method:

$$\sum_{i=1}^{n} \tilde{f}_i \overline{\phi}_i = \overline{\phi}_{an,j}$$

for all j=1, . . . , m records of the analog data base and the n unknowns $\tilde{f}_i$ i=1, . . . , n;
means for calculating the mean porosity $\overline{\phi}_i$ for each facies $F_i$, i=1 . . . n; and,
means for selecting for $\overline{\phi}_{an,j}=1, \ldots, m$ the mean values of the m records obtained from the analog data base,
means for calculating for each facies $F_i$, i=1 . . . n, the average value of the saturation $\overline{S}_i$ being calculated by solving the over determined system of equations, by least square method:

$\Sigma_{i=1}^{n} \tilde{f}_i \overline{S}_i = \overline{S}_{an,j}.$

5. A data processing system according claim 2, wherein the means for selecting m records of the analog data base further comprises means for determining net-to-gross NTG values of the materials for $\overline{NTG}$, forming such data by postprocessing and the averaging NTG for each facies comprising:
means for solving for the m selected records, where m>n, the over determined system of m equations, preferably by mean square method:

$$\sum_{i=1}^{n} \tilde{f}_i \overline{\phi}_i = \overline{\phi}_{an,j}$$

for all j=1, . . . , m records of the analog data base and the n unknowns $\tilde{f}_i$ i=1, . . . , n;
means for calculating the mean porosity $\overline{\phi}_i$ for each facies $F_i$, i=1 . . . n; and,
means selecting for $\overline{\phi}_{an,j}$ j=1, . . . , m the mean values of the m records obtained from the analog data base,
means for calculating for each facies $F_i$, i=1 . . . n, the average value of the net-to-gross $\overline{NTG}_i$ by solving the over determined system of equations, by least square method:

$\Sigma_{i=1}^{n} \tilde{f}_i \overline{NTG}_i = \overline{NTG}_{an,j}.$

6. A data processing system according to claim 1, further comprising means for providing an analog data base of known reservoir records wherein each record includes scalar data of material properties for determining values such as facies properties, and wherein:
the records of the analog data base further include volumetric data such as the reservoir area and thickness, NTG (net-to-gross) and saturation information,
means for generating a plurality of three-dimensional scenarios having a three-dimensional domain, wherein the domain is generated randomly from a multidimensional correlation between area and thickness and has a volume verifying that is big enough to store the oil calculated according to the volumetric data.

7. A data processing system according to claim 1, wherein the means for multipoint statistical analysis restricts each scenario to the number of facies n, the partial rates of facies $f_i$, i=1 ... n, and spatially distributes the property $\phi$ based on its statistical distribution $\bar{\phi}_i$, $\phi_i^{min}$, $\phi_i^{max}$ according to a geo-statistical algorithm, to a predetermined longitudinal correlation equation and to a predetermined orientation.

* * * * *